Patented Feb. 21, 1933

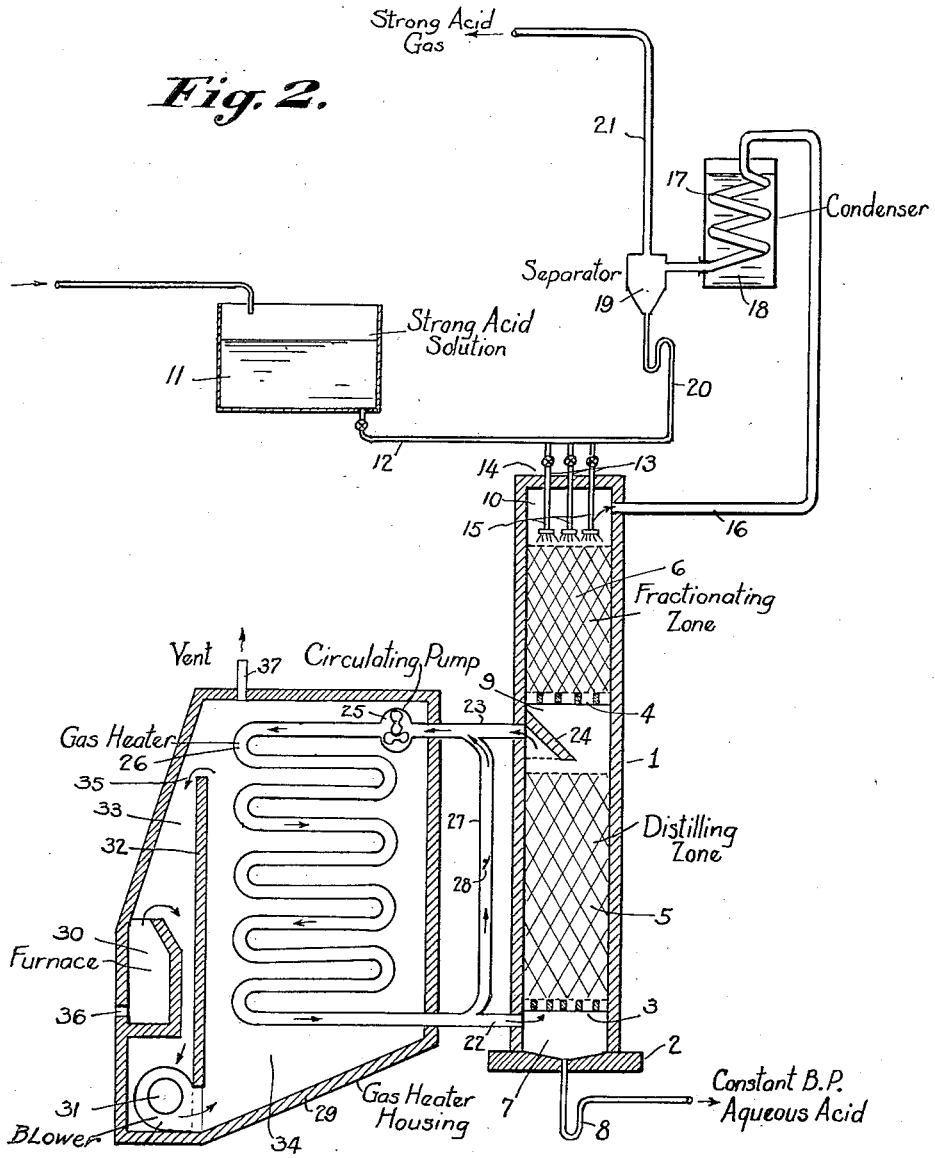
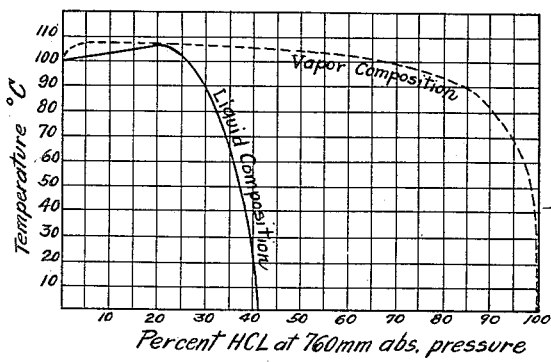

1,897,996

UNITED STATES PATENT OFFICE

EDWIN O. BARSTOW AND SHELDON B. HEATH, OF MIDLAND, MICHIGAN, ASSIGNORS TO THE DOW CHEMICAL COMPANY, OF MIDLAND, MICHIGAN, A CORPORATION OF MICHIGAN

PREPARATION OF STRONG HYDROGEN HALIDE GAS

Application filed October 4, 1929. Serial No. 397,198.

This invention relates to methods for the preparation of a strong hydrogen halide gas by distilling an aqueous solution of such hydrogen halide, and particularly to the preparation of a strong hydrochloric acid gas.

The distillation of such aqueous acid solutions has heretofore been attended with serious practical difficulties, due to the extremely corrosive action thereof upon all of the common structural metals. The choice of structural materials for the distillation apparatus has accordingly been limited to a narrow range of acid-resisting materials which are mechanically weak, easily breakable and have a low conductivity for heat.

It is an object of our invention to provide a method for distilling the above mentioned aqueous acids which utilizes both the sensible and latent heat of a vapor condensable at the distillation temperature in direct contact with the aqueous acid during the distillation, thus eliminating altogether the transmission of heat through a solid wall or partition of poorly heat-conducting material. Another object is to enable the distillation to be carried out in relatively large sized apparatus which is more strongly constructed and less easily destructible than the types of apparatus heretofore employed for similar purposes. Other objects and advantages will be disclosed as the description continues.

To the accomplishment of the foregoing and related ends the invention, then, consists of the steps and means hereinafter fully described and particularly pointed out in the claims, the annexed drawing and following description setting forth in detail certain means and one mode of carrying out the invention, such disclosed means and mode illustrating, however, but a few of the various ways in which the principle of the invention may be used.

In said annexed drawings:—

Fig. 1 is a chart showing liquid and vapor composition curves for boiling solutions of hydrochloric acid in water at normal atmospheric pressure, 760 mm. Fig. 2 is a diagrammatic representation in vertical cross-section of an apparatus adapted to carrying out our improved method.

In Fig. 1 the solid line curve represents the composition of boiling aqueous solutions of hydrochloric acid plotted against temperatures, and the broken line curve represents the composition of the vapor in equilibrium therewith. A common maximum point for both curves is found at a temperature of 108° C. and a composition of 20.2 per cent HCl, corresponding to a constant boiling point mixture. The solid line curve also constitutes a boiling point temperature curve for aqueous hydrochloric acid solutions in equilibrium with the saturated vapor thereof at normal atmospheric pressure. When an aqueous hydrochloric acid solution of greater strength than the constant boiling point mixture is distilled under fractionating conditions a more or less complete separation of acid gas and water may be secured depending upon the temperature maintained in the vapor space at the top of the fractionating column. Referring to the broken line curve, it will be seen that, if the temperature of the exit vapors from the distillation is controlled at a point not exceeding 70° C., the strength of the hydrochloric acid gas obtained will be 95 per cent or more.

In the method of the present invention the heat required for the distillation is primarily supplied by a current of hot gas or vapor in direct contact with the aqueous acid solution in a distilling column, such hot gas or vapor giving up its sensible heat to the acid solution being distilled, thereby forming saturated vapors of aqueous acid. Such saturated vapors are then contacted in a fractionating column with a further supply of aqueous acid solution having a strength in excess of the constant boiling point mixture, the vapors being thereby condensed and the latent heat of vaporization thereof being utilized for distilling off the excess gaseous acid from the solution. By recycling the primary heating gases or vapors in a continuous circuit the residual heat content thereof may be conserved and in such way that when continuous operation is once freely established, such heating vapors will have approximately 10 the composition of the constant boiling point mixture, as will be hereinafter further explained.

Referring to Fig. 2, column 1 constructed of suitable acid-resisting material, such as sandstone, granite, carbon, etc., is supported upon a base slab 2, and carries interiorly two gratings 3 and 4 which in turn support the bodies of packing material 5, forming a distillation zone, and 6, forming a fractionating zone, respectively. Space 7 is provided for collecting liquid in the base of the column, the same having a trapped outlet 8. An intermediate vapor space 9 within the column, and vapor space 10 at the top thereof are located above distillation zone 5 and fractionation zone 6, respectively. An acid supply tank 11 is connected by a header pipe 12 and laterals 13 with the upper vapor space 10 of column 1, laterals 13 projecting through the cover plate 14 of the column, and carrying at the lower ends thereof spray nozzles 15 or equivalent device for distributing acid solution over the surface of packing in 6. Outlet pipe 16 for exit gases leads to a condenser coil 17, placed in tank 18, and condenser 17 is connected with a separator 19. From the latter a trapped return pipe 20 connects with header 12, and exit pipe 21 serves to convey strong acid gases to the point of use thereof.

An inlet 22 to the base of column 1 is provided for admitting heating gases, and an outlet 23 therefor, shielded by a baffle wall 24, connects with a gas heating system consisting of a circulating pump 25 and a heater coil 26, the latter being connected with inlet 22, the whole forming a circuit for the continuous circulation of heating gases in the direction shown by the arrows. A by-pass 27 equipped with a damper or valve 28 connects inlet pipe 22 and outlet pipe 23 outside of column 1. The circulating pump 25 and heater coil 26 are enclosed within a housing 29 constructed of heat retaining material, and which also contains a furnace or combustion chamber 30 and a blower 31 for circulating furnace gases from furnace 30 within the housing 29. The interior of the housing is divided by a baffle wall or partition 32 into two compartments 33 and 34 connected at the top by passage 35. Blower 31 draws the furnace gases from compartment 33 and delivers them into compartment 34 wherein they are circulated around the coils of heater 26 and thence returned through passage 35 to compartment 33, mixing there with additional furnace gases and being again circulated as before in the direction indicated by the arrows. Any suitable fuel, solid, liquid or gaseous, is introduced into furnace 30 through door or opening 36 and is burnt therein, the hot combustion gases therefrom being circulated within housing 29 as just described. The respective rates of supply of fuel and of circulation of furnace gases are controlled so as to maintain the required temperature of the heater coil 26, excess of spent furnace gases being vented at vent 37.

In operation the furnace gases within housing 29 are employed for heating the circulating gases within the heater coil 26, preferably to a temperature of about 300° to 325° C. The circulating gases in turn are conveyed to the base of column 1 and rise upwardly through the packing in distilling zone 5 against a downflowing stream of aqueous hydrochloric acid solution from fractionating zone 6. The heating gases cause the aqueous acid solution to boil and vaporize a mixture of hydrochloric acid gas and water vapor, so that, under properly regulated rates of flow of heating gases and aqueous acid, the temperature within the distillation zone is caused to rise to that of the constant boiling point mixture, i. e. 108° C. The vapors rising into intermediate vapor space 9 consequently have the approximate composition of such mixture. A portion of such vapors corresponding in volume to that of the heating gases entering the column at inlet 22 is constantly withdrawn at outlet 23 and recirculated through heater coil 26 by means of gas pump 25, the gases being reheated previously to being returned to the base of the column. The remaining portion of vapors in vapor space 9 continues to rise through the column in the fractionating zone 6 in contact with the descending flow of aqueous acid supplied from feed tank 11 through header 12, laterals 13 and nozzles 15. The hot vapors distill out the excess of hydrochloric acid gas above the constant boiling point composition from the aqueous acid under fractionating conditions and are thereby condensed, the latent heat of vaporization of such vapors being liberated and supplying the heat for such distillation. By suitably regulating the rate of flow of solution and vapors the temperature of the acid gas arriving in upper vapor space 10 may be maintained at or below 70° C., whereat the gas composition will be 95 per cent HCl or more, as appears by reference to the chart in Fig. 1. The aqueous acid solution flowing from the fractionating zone 6 and into the distillation zone 5 will have approximately the constant boiling point composition. A portion of such solution will be revaporized in the distillation zone, furnishing a continuous supply of circulating and heating vapors, while a residual portion flows as a hot solution from the base of column 1 through draw-off pipe 8, such portion containing whatever non-volatile impurities may have been dissolved in the original strong acid solution fed to the column. The further utilization of such residual acid solution withdrawn from column 1 is not a part of this invention, however, it may conveniently be cooled and employed for absorbing further quantities of hydrochloric acid gas from gaseous mixtures containing the same, and the fortified acid solution thereby obtained may be returned to the distillation.

When operation of the process is started the gas passages of heater coil 26, as well as the voids and interstices between the packing material of column 1, will be filled chiefly with air, and temporarily during the starting up operations heated air will form the principal heating gas. With continued operation, however, the original air in the system is soon vented with the strong acid gases leaving the column at 16, and the circulating gases or vapors then consist substantially of a mixture of hydrochloric acid gas and water vapor approximately in the proportions of the constant boiling point mixture, the volume thereof remaining substantially constant during continuance of the process. Thereafter, likewise, the volumes of strong acid gas and constant boiling point acid solution removed from the system correspond in sum to the volume and strength of the strong aqueous acid solution fed to the distillation column.

For ease and economy of construction, as well as to create the most advantageous conditions for heat transmission in the heating coil 26, the latter including accessory piping and connections is preferably to be constructed of iron or steel. Although hydrochloric acid is highly corrosive to iron at ordinary temperatures or at high temperatures, we have found that if the acid gas, or mixture thereof with water vapor, is kept within an intermediate range of temperature between about 140° and 325° C. there is little or no material attack upon an iron surface exposed thereto. Such temperature limits comprise roughly the range within which a solution of iron chloride may be evaporated to dryness and yet below the point whereat any substantial sublimation of dry iron chloride occurs. It is probable that within such temperature limits a surface film of iron chloride forms on the metal parts exposed to the acid vapors and protects the metal from further attack. In the apparatus illustrated in Fig. 2 outlet pipe 23 for circulating vapors leaving column 1 is advisedly to be made of acid resisting material, since the moist vapors passing therethrough are at a temperature below 140° C. To protect the other parts of the gas heating apparatus from corrosion, by-pass 27 is provided through which by suitable regulation of valve 28 a sufficient volume of hot gases at about 300° C. is by-passed and mixed with the cooler vapors in pipe 23 to raise the temperature of the resulting mixture above 140° C. By such arrangement it becomes practically possible to employ iron or steel for the construction of pump 25 and of heater coil 26.

The strong acid gas, e. g. containing 95 per cent HCl or more, leaving the column through exit pipe 16 at a temperature in the neighborhood of 70° C. or lower may be conducted first to a condenser 17, wherein by further cooling the residual moisture content thereof is largely condensed out as a saturated aqueous acid solution. Such solution is separated in separator 19 and returned to the column through pipe 20 connecting with header 12. The substantially dry, strong hydrochloric acid gas is thence withdrawn through exit pipe 21 to the point of use thereof. The condenser, however, may be dispensed with if the rate of distillation is so regulated that the temperature of the vapors leaving the column is held to as low as 30° C. or thereabout, in which case the exit vapors will be for practical purposes substantially anhydrous. A further means for cooling the exit vapors would be by contact with a chilled strong acid solution supplied through nozzles 15, the feed solution from tank 11 being cooled to a sufficiently low temperature before introducing same into the column.

Naturally, the herein described method is capable of being so carried out that aqueous acid vapors of lower acid content may be separated and conducted away, simply by increasing the rate of distillation and consequently the temperature of the exit vapors. In fact, the method may be employed, if desired, for purifying a concentrated acid solution from non-volatile impurities by distilling off and condensing aqueous acid vapors containing between about 20 and 35 per cent HCl. When the method is applied in this way, the apparatus would be modified to provide a condenser of suitable design and larger capacity sufficient for condensing the greater volume of water vapor coming from the column, and the condensate therefrom would be discharged into separate receiver instead of being returned to the column, as shown in the drawing.

By similar procedure aqueous solutions of hydrobromic acid may likewise be distilled, making due allowance in operation for the boiling point temperatures of such solutions. The constant boiling point solution contains 44 per cent HBr and boils at 126° C. Consequently operation with such solutions is to be conducted so as to maintain a maximum temperature of 126° C. for the circulating vapors in the distillation zone.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:—

1. The method of preparing strong hydrochloric acid gas which comprises flowing a distributed stream of an aqueous solution thereof having a concentration in excess of the constant boiling point mixture in direct heat exchange relation with the saturated vapors of said mixture at the atmospheric boiling point thereof, whereby said excess of hydrochloric acid is liberated as gas and said vapors are condensed as liquid, removing said gas, contacting said condensed liquid with vapors of aqueous hydrochloric acid in a superheated condition, whereby a portion of the liquid is revaporized as a saturated vapor, while a residual solution of like composition flows from the vaporization zone, withdrawing and reheating a portion of such saturated vapors, returning the reheated vapors to said revaporization step, and employing the remaining portion of saturated vapors for distilling the concentrated solution in the first step.

2. The method of preparing strong hydrochloric acid gas which comprises flowing a distributed stream of an aqueous solution thereof having a concentration in excess of the constant boiling point mixture in direct heat exchange relation with the saturated vapors of said mixture at the atmospheric boiling point thereof, whereby said excess of hydrochloric acid is liberated as gas and said vapors are condensed as liquid, removing said gas, contacting said condensed liquid vapors of aqueous hydrochloric acid heated initially to a temperature of approximately 300° C. whereby a portion of the liquid is revaporized as a saturated vapor, while a residual solution of like composition flows from the distillation zone, withdrawing and reheating a portion of such saturated vapors, returning the reheated vapors to said revaporization step, and employing the remaining portion of saturated vapors for distilling the concentrated solution in the first step.

3. The method of preparing strong hydrochloric acid gas which comprises flowing a distributed stream of an aqueous solution thereof having a concentration in excess of the constant boiling point mixture in direct heat exchange relation with the saturated vapors of said mixture at the atmospheric boiling point thereof, whereby said excess of hydrochloric acid is liberated as gas and said vapors are condensed as liquid, removing said gas, contacting said condensed liquid with vapors of aqueous hydrochloric acid heated initially to a temperature of approximately 300° C. whereby a portion of the liquid is revaporized as a saturated vapor, while a residual solution of like composition flows from the distillation zone, withdrawing a portion of such saturated vapors, mixing therewith a portion of the superheated vapors, which has been by-passed from the main body thereof before the latter is contacted with said condensed vapors, so that the temperature of the mixed vapors is maintained above 140° C., reheating the mixed vapors to approximately 300° C., returning the reheated vapors to said revaporization step and employing the remaining portion of the saturated vapors for distilling the concentrated solution in the first step.

4. In a method of preparing a strong acid gas of the class consisting of hydrogen bromide and hydrogen chloride, the step which consists in contacting an aqueous solution of such acid, having a concentration in excess of the constant boiling point mixture, with the hot saturated vapors of such constant boiling point composition, whereby such excess of acid is vaporized by transfer of heat from said vapors.

5. In a method of preparing a strong hydrochloric acid gas, the step which consists in contacting an aqueous solution thereof, having a concentration in excess of the constant boiling point mixture, with the hot saturated vapors of such constant boiling point composition, whereby such excess of hydrochloric acid is vaporized from the solution by transfer of heat from said vapors.

6. The method of preparing a strong acid gas of the class consisting of hydrogen bromide and hydrogen chloride which comprises contacting a stream of an aqueous solution of such acid, having a concentration in excess of the constant boiling point mixture, with a counterflowing current of the hot saturated vapors of such constant boiling point composition, condensing and refluxing the aqueous component of the vapors thereby produced and separating the strong acid gas therefrom.

7. The method of preparing a strong hydrochloric acid gas which comprises contacting a stream of an aqueous solution thereof, having a concentration in excess of the constant boiling point mixture, with a counterflowing current of the hot saturated vapors of such constant boiling point composition, condensing and refluxing the aqueous component of the vapors thereby produced and separating the strong hydrochloric acid gas therefrom.

Signed by us this 30th day of September, 1929.

EDWIN O. BARSTOW.
SHELDON B. HEATH.